United States Patent
Suzuki et al.

(10) Patent No.: US 11,686,647 B2
(45) Date of Patent: Jun. 27, 2023

(54) LEAK CHECK METHOD, LEAK CHECK APPARATUS, PLATING METHOD, AND PLATING APPARATUS

(71) Applicant: EBARA CORPORATION, Tokyo (JP)

(72) Inventors: Kiyoshi Suzuki, Tokyo (JP); Jumpei Fujikata, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

(21) Appl. No.: 17/839,400

(22) Filed: Jun. 13, 2022

(65) Prior Publication Data
US 2022/0307938 A1   Sep. 29, 2022

Related U.S. Application Data

(62) Division of application No. 16/711,983, filed on Dec. 12, 2019, now Pat. No. 11,385,125.

(30) Foreign Application Priority Data

Dec. 28, 2018 (JP) .................. 2018-247443

(51) Int. Cl.
*G01M 3/32* (2006.01)
*C25D 7/12* (2006.01)
(Continued)

(52) U.S. Cl.
CPC .......... *G01M 3/3263* (2013.01); *C25D 7/123* (2013.01); *C25D 17/001* (2013.01); *C25D 17/004* (2013.01); *C25D 17/06* (2013.01)

(58) Field of Classification Search
CPC ........... C25D 17/004; C25D 7/12–123; H01L 21/2885; H01L 21/76873; H01L 2224/11462
See application file for complete search history.

(56) References Cited

U.S. PATENT DOCUMENTS

2003/0122292 A1* 7/2003 Waring .................. C25D 21/12
  266/251
2004/0217006 A1* 11/2004 Small ................ H01L 21/02052
  257/E21.228
(Continued)

FOREIGN PATENT DOCUMENTS

JP  2001-221707 A  8/2001
JP  2003-021570 A  1/2003
(Continued)

OTHER PUBLICATIONS

Lou et al., Electroplating, Encyclopedia of Chem. Proc. (Year: 2006).*

*Primary Examiner* — Hosung Chung
(74) *Attorney, Agent, or Firm* — BakerHostetler (57) ABSTRACT

A leak check method includes: performing a first inspection of measuring a pressure in an internal space formed by a seal of the substrate holder, while evacuating the internal space, and detecting that the pressure reaches a first pressure threshold value within a predetermined first inspection time; performing a second inspection of closing the internal space that has been evacuated, measuring the pressure in the closed internal space, and detecting that the pressure in the closed internal space does not exceed a second pressure threshold value within a predetermined second inspection time; and performing a third inspection of measuring a pressure difference between the pressure in the closed internal space and a vacuum pressure in a master container, and detecting that an amount of increase in the pressure difference within a predetermined third inspection time is kept equal to or below a pressure difference threshold value.

8 Claims, 9 Drawing Sheets

(51) Int. Cl.
  *C25D 17/06* (2006.01)
  *C25D 17/00* (2006.01)

(56) References Cited

U.S. PATENT DOCUMENTS

| | | | |
|---|---|---|---|
| 2005/0089645 A1* | 4/2005 | Keigler | C25D 17/06 427/443.1 |
| 2016/0099229 A1* | 4/2016 | Choi | H01L 21/76898 257/737 |
| 2017/0159203 A1* | 6/2017 | Minami | G01M 3/3263 |

FOREIGN PATENT DOCUMENTS

| | | |
|---|---|---|
| JP | 2003-254855 A | 9/2003 |
| JP | 2007-509241 A | 4/2007 |
| JP | 2013-204057 A | 10/2013 |
| JP | 2016-135923 A | 7/2016 |
| JP | 2018-179840 A | 11/2018 |

\* cited by examiner

LEAK CHECK METHOD, LEAK CHECK APPARATUS, PLATING METHOD, AND PLATING APPARATUS

CROSS REFERENCE TO RELATED APPLICATION

This application is a divisional of U.S. patent application Ser. No. 16/711,983, filed Dec. 12, 2019, which claims priority to Japanese Patent Application Number 2018-247443 filed Dec. 28, 2018, the contents of each of which are incorporated herein by reference in their entirety.

BACKGROUND

An electroplating apparatus, which is an example of a plating apparatus, is configured to immerse a substrate (for example, a wafer) held by a substrate holder in a plating solution, and apply a voltage between the substrate and an anode to deposit a conductive film on a surface of the substrate. Since the substrate holder is immersed in the plating solution during plating of the substrate, it is necessary to securely seal a periphery of the substrate in order to prevent the plating solution from contacting electrical contacts which are in contact with the periphery of the substrate.

In a case where the sealing state is incomplete, the plating solution may intrude onto the periphery of the substrate, possibly causing corrosion of the electrical contacts and hindering the supply of electric power to the substrate. Therefore, a leak check has been proposed to check whether a fluid leaks into a space formed by seal members before plating of a substrate and after sealing of a periphery of the substrate with the seal members (see, for example, Japanese Laid-open Patent Publication No. 2016-135923).

If the fluid leaks into the above-described space, it is necessary to take an appropriate action for the substrate holder. For example, if the leak occurs due to a damage to the seal member, it is necessary to replace the seal member with new one. If the leak occurs due to a foreign matter attached to the seal member, it is necessary to clean the seal member. Thus, it is necessary to take an appropriate action on the substrate holder based on the degree of leakage.

Further, there has recently been an increasing demand for improving a throughput of the plating process. The above-described leak check is performed before plating of a substrate, and therefore it is possible to prevent in advance a plating failure caused by a contact between the plating solution and the electrical contacts. However, the leak check entails a certain period of time, thus resulting in a decrease in the throughput.

SUMMARY OF THE INVENTION

According to embodiments, there are provided a leak check method and a leak check apparatus capable of appropriately determining a degree of leakage. According to an embodiment, there is provided a plating apparatus including such a leak check apparatus. Further, according to embodiments, there are provided a plating method and a leak check apparatus which can improve a throughput by performing a leak check based on a substrate plating condition. Further, according to an embodiment, there is provided a plating apparatus including such a leak check apparatus.

Embodiments, which will be described below, relate to a leak check method and a leak check apparatus for inspecting a sealing state of a substrate holder used for plating a substrate. Further, embodiments, which will be described below, relate to a leak check method and a plating apparatus including such a leak check method and a leak check apparatus, respectively.

In an embodiment, there is provided a leak check method for a substrate holder to be used in plating of a substrate, comprising: performing a first inspection of measuring a pressure in an internal space formed by a seal of the substrate holder, while evacuating the internal space, and detecting that the pressure reaches a first pressure threshold value within a predetermined first inspection time; performing a second inspection of closing the internal space that has been evacuated, measuring the pressure in the closed internal space, and detecting that the pressure in the closed internal space does not exceed a second pressure threshold value within a predetermined second inspection time; and performing a third inspection of measuring a pressure difference between the pressure in the closed internal space and a vacuum pressure in a master container, and detecting that an amount of increase in the pressure difference within a predetermined third inspection time is kept equal to or below a pressure difference threshold value.

In an embodiment, the first inspection includes generating an alarm signal when the pressure in the internal space does not reach the first pressure threshold value within the predetermined first inspection time.

In an embodiment, the second inspection includes generating an alarm signal when the pressure in the closed internal space exceeds the second pressure threshold value within the predetermined second inspection time.

In an embodiment, the third inspection includes generating an alarm signal when the amount of increase in the pressure difference within the predetermined third inspection time exceeds the pressure difference threshold value.

In an embodiment, there is provided a method of plating a substrate with use of a substrate holder, comprising: performing one of a simple leak check, a composite leak check, and a precision leak check on the substrate holder, the one being selected based on a plating condition for the substrate; and plating the substrate with use of the substrate holder, wherein the simple leak check comprises a first inspection of measuring a pressure in an internal space formed by a seal of the substrate holder, while evacuating the internal space, and detecting that the pressure reaches a first pressure threshold value within a predetermined first inspection time, the composite leak check comprises a combination of the first inspection and a second inspection, the second inspection including closing the internal space that has been evacuated, measuring the pressure in the closed internal space, and detecting that the pressure in the closed internal space does not exceed a second pressure threshold value within a predetermined second inspection time, and the precision leak check comprises a combination of the first inspection, the second inspection, and a third inspection, the third inspection including measuring a pressure difference between the pressure in the closed internal space and a vacuum pressure in a master container, and detecting that an amount of increase in the pressure difference within a predetermined third inspection time is kept equal to or below a pressure difference threshold value.

In an embodiment, the first inspection includes generating an alarm signal when the pressure in the internal space does not reach the first pressure threshold value within the predetermined first inspection time.

In an embodiment, the second inspection includes generating an alarm signal when the pressure in the closed internal space exceeds the second pressure threshold value within the predetermined second inspection time.

In an embodiment, the third inspection includes generating an alarm signal when the amount of increase in the pressure difference within the predetermined third inspection time exceeds the pressure difference threshold value.

In an embodiment, the simple leak check or the composite leak check is performed when a thickness of a seed layer of the substrate, to be plated, is larger than a predetermined reference film thickness, and the precision leak check is performed when a thickness of a seed layer of the substrate, to be plated, is not more than the predetermined reference film thickness.

In an embodiment, the simple leak check or the composite leak check is performed when a plating time for the substrate, to be plated, is shorter than a predetermined reference plating time, and the precision leak check is performed when a plating time for the substrate, to be plated, is not less than the predetermined reference plating time.

In an embodiment, there is provided a leak check apparatus for a substrate holder to be used in plating of a substrate, comprising: a vacuum line communicating with an internal space formed by a seal of the substrate holder; a first on-off valve coupled to the vacuum line; a second on-off valve coupled to the vacuum line; a pressure measuring device configured to measure a pressure in the internal space; a master container communicating with the vacuum line; and a differential-pressure measuring device configured to measure a pressure difference between a pressure in the internal space and a pressure in the master container, the pressure measuring device is coupled to a part of the vacuum line extending between a substrate-holder-side end of the vacuum line and the second on-off valve, the master container is coupled to a part of the vacuum line extending between the first on-off valve and the second on-off valve, and the pressure measuring device, the second on-off valve, and the first on-off valve are arranged in series along the vacuum line in the order of the pressure measuring device, the second on-off valve, and the first on-off valve.

In an embodiment, the leak check apparatus further comprises an operation controller configured to control operations of the first on-off valve and the second on-off valve, wherein the operation controller is configured to detect that a pressure in the internal space reaches a first pressure threshold value within a predetermined first inspection time, while producing a vacuum pressure in the internal space by opening the first on-off valve and the second on-off valve.

In an embodiment, the operation controller is configured to generate an alarm signal when the pressure in the internal space does not reach the first pressure threshold value within the predetermined first inspection time.

In an embodiment, the operation controller is configured to close the first on-off valve to close the internal space in which the vacuum pressure has been produced, and detect that the pressure in the closed internal space does not exceed a second pressure threshold value within a predetermined second inspection time.

In an embodiment, the operation controller is configured to generate an alarm signal when the pressure in the closed internal space exceeds the second pressure threshold value within the predetermined second inspection time.

In an embodiment, the operation controller is configured to close the second on-off valve to shut off a communication between the internal space and the master container, and detect that an amount of increase in a pressure difference between the pressure in the closed internal space and the vacuum pressure in the master container within a predetermined third inspection time is kept equal to or below a pressure difference threshold value.

In an embodiment, the operation controller is configured to generate an alarm signal when the amount of increase in the pressure difference within the predetermined third inspection time exceeds the pressure difference threshold value.

In an embodiment, there is provided a plating apparatus comprising: a plating tank configured to hold a plating solution therein; an anode arranged in the plating tank; a substrate holder configured to detachably hold a substrate and immerse the substrate in the plating solution in the plating tank; a plating power source configured to apply a voltage between the anode and the substrate held by the substrate holder; and a leak check apparatus including: (i) a vacuum line communicating with an internal space formed by a seal of the substrate holder; (ii) a first on-off valve coupled to the vacuum line; (iii) a second on-off valve coupled to the vacuum line; (iv) a pressure measuring device configured to measure a pressure in the internal space; (v) a master container communicating with the vacuum line; and (vi) a differential-pressure measuring device configured to measure a pressure difference between a pressure in the internal space and a pressure in the master container, wherein the pressure measuring device is coupled to a part of the vacuum line extending between a substrate-holder-side end of the vacuum line and the second on-off valve, the master container is coupled to a part of the vacuum line extending between the first on-off valve and the second on-off valve, and the pressure measuring device, the second on-off valve, and the first on-off valve are arranged in series along the vacuum line in an order of the pressure measuring device, the second on-off valve, and the first on-off valve.

In an embodiment, the operation controller includes a first inspection program for causing the operation controller to perform the steps of detecting that a pressure in the internal space reaches a first pressure threshold value within a predetermined first inspection time, while producing a vacuum pressure in the internal space by opening the first on-off valve and the second on-off valve.

In an embodiment, the first inspection program includes a program for causing the operation controller to perform the step of generating an alarm signal when the pressure in the internal space does not reach the first pressure threshold value within the predetermined first inspection time.

In an embodiment, the operation controller includes a second inspection program for causing the operation controller to perform the steps of closing the first on-off valve to close the internal space in which the vacuum pressure has been produced, and detecting that the pressure in the closed internal space does not exceed a second pressure threshold value within a predetermined second inspection time.

In an embodiment, the second inspection program includes a program for causing the operation controller to perform the step of generating an alarm signal when the pressure in the closed internal space exceeds the second pressure threshold value within the predetermined second inspection time.

In an embodiment, the operation controller includes a third inspection program for causing the operation controller to perform the steps of closing the second on-off valve to shut off a communication between the internal space and the master container, and detecting that an amount of increase in a pressure difference between the pressure in the closed internal space and the vacuum pressure in the master container within a predetermined third inspection time is kept equal to or below a pressure difference threshold value.

In an embodiment, the third inspection program includes a program for causing the operation controller to perform the step of generating an alarm signal when the amount of increase in the pressure difference within the predetermined third inspection time exceeds the pressure difference threshold value.

According to the above-described embodiments, the degree of leakage can be determined more finely by performing the leak check in the three stages. Furthermore, according to the above-described embodiments, the throughput can be improved by performing the leak check selected based on the plating condition for the substrate.

DESCRIPTION OF EMBODIMENTS

Figure 1:
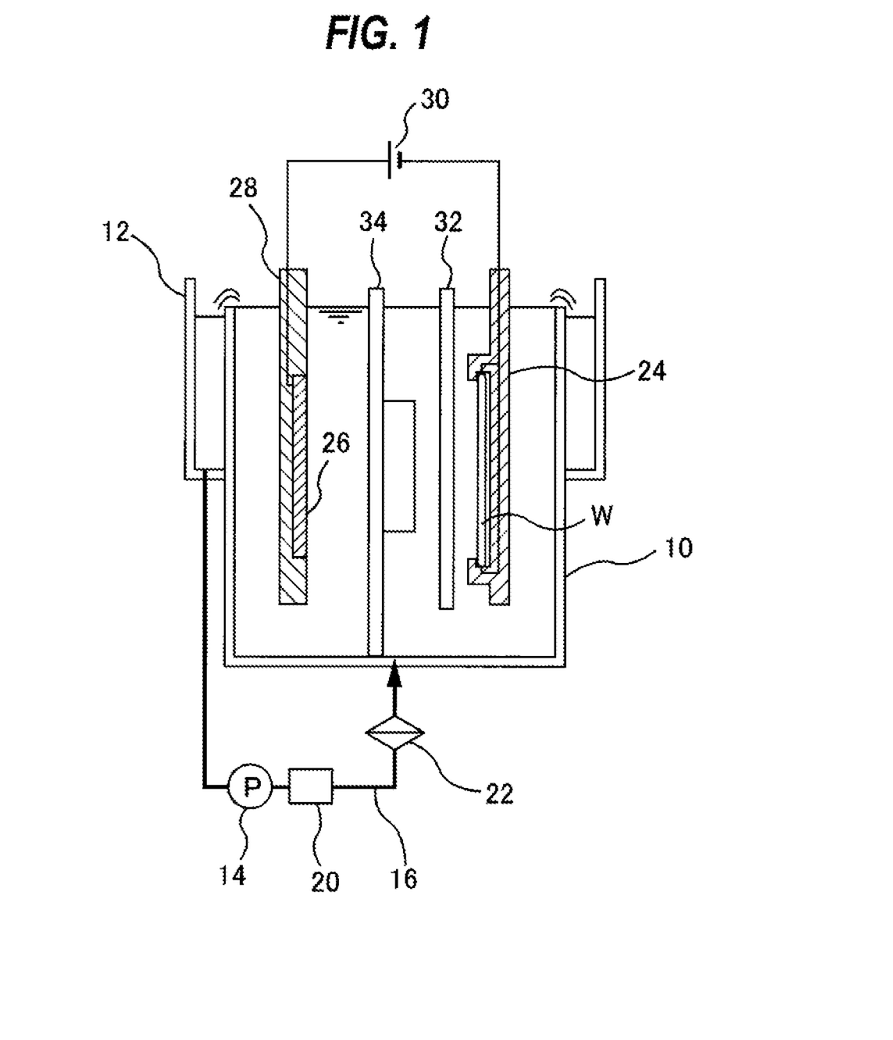
FIG. 1 is a vertical cross-sectional front view showing an embodiment of an electroplating apparatus which is an example of a plating apparatus.

Embodiments will now be described with reference to the drawings. FIG. 1 is a vertical cross-sectional front view showing an embodiment of an electroplating apparatus which is an example of a plating apparatus. As shown in FIG. 1, the electroplating apparatus includes a plating tank 10. A plating solution is held in the plating tank 10. An overflow tank 12 for receiving the plating solution that has overflowed a top edge of the plating tank 10 is provided adjacent to the plating tank 10.

One end of a plating-solution circulation line 16, which is provided with a pump 14, is coupled to a bottom of the overflow tank 12, while other end of the plating-solution circulation line 16 is coupled to a bottom of the plating tank 10. The plating solution that has accumulated in the overflow tank 12 is returned through the plating-solution circulation line 16 to the plating tank 10 by the actuation of the pump 14. A temperature control device 20 for controlling the temperature of the plating solution, and a filter 22 for removing foreign matter from the plating solution, both located downstream of the pump 14, are attached to the plating-solution circulation line 16.

The electroplating apparatus includes a substrate holder 24 which detachably holds a substrate (a workpiece to be plated) W, such as a wafer, and immerses the substrate W in a vertical state in the plating solution held in the plating tank 10. The electroplating apparatus further includes an anode 26 arranged in the plating tank 10, an anode holder 28 holding the anode 26, and a plating power source 30. When the substrate holder 24 holding the substrate W is set in the plating tank 10, the substrate W and the anode 26 face each other in the plating tank 10. The substrate W has a conductive layer (for example, a seed layer) that has been formed in advance on a surface (surface to be plated) of the substrate W. The anode 26 is electrically connected to a positive electrode of the plating power supply 30, and the conductive layer of the substrate W is connected to a negative electrode of the plating power supply 30 via the substrate holder 24. When the plating power source 30 applies a voltage between the anode 26 and the substrate W, the substrate W is plated in the presence of the plating solution. As a result, a metal (e.g., copper) is deposited on the surface of the substrate W.

A paddle 32, which is configured to reciprocate parallel to the surface of the substrate W to agitate the plating solution, is disposed between the substrate holder 24 and the anode 26. By agitating the plating solution with the paddle 32, a sufficient amount of metal ions can be supplied uniformly to the surface of the substrate W. Further, a regulation plate 34 made of a dielectric material is disposed between the paddle 32 and the anode 26 for making distribution of electric potential more uniform over the entire surface of the substrate W.

Figure 2:
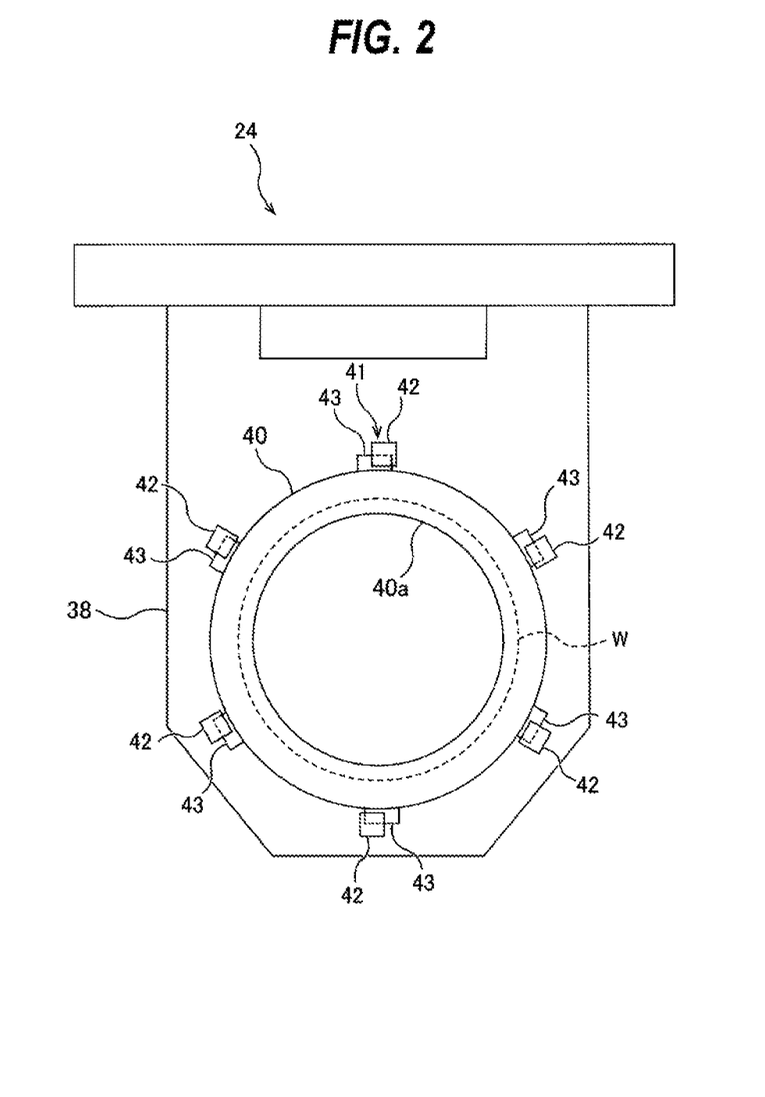
FIG. 2 is a schematic front view showing a substrate holder.
Figure 3:
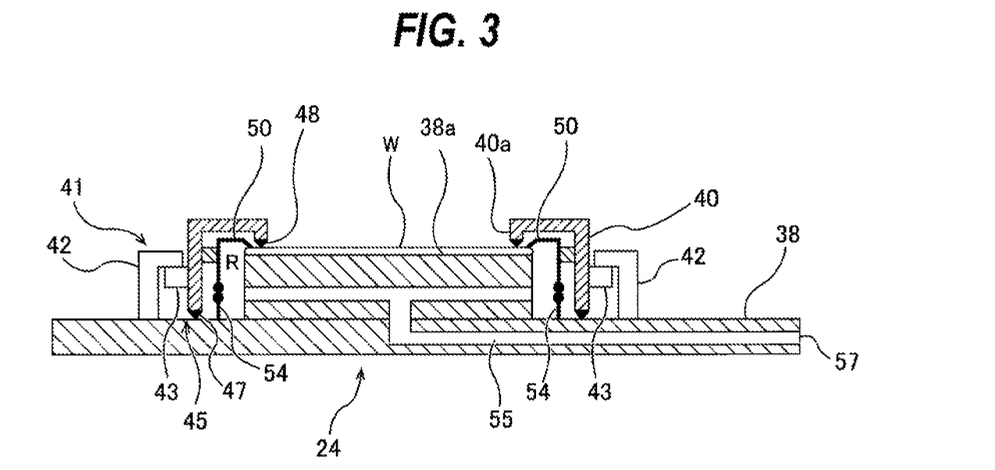
FIG. 3 is a schematic cross-sectional view showing the substrate holder.

FIG. 2 is a schematic front view showing the substrate holder 24, and FIG. 3 is a schematic cross-sectional view showing the substrate holder 24. The substrate holder 24 is configured to be used in the electroplating apparatus for electroplating the substrate W, such as a wafer. The substrate holder 24 includes a first holding member 38 and a second holding member 40 for holding the substrate W. The second holding member 40 is secured to the first holding member 38 by a coupling mechanism 41.

Figure 4:
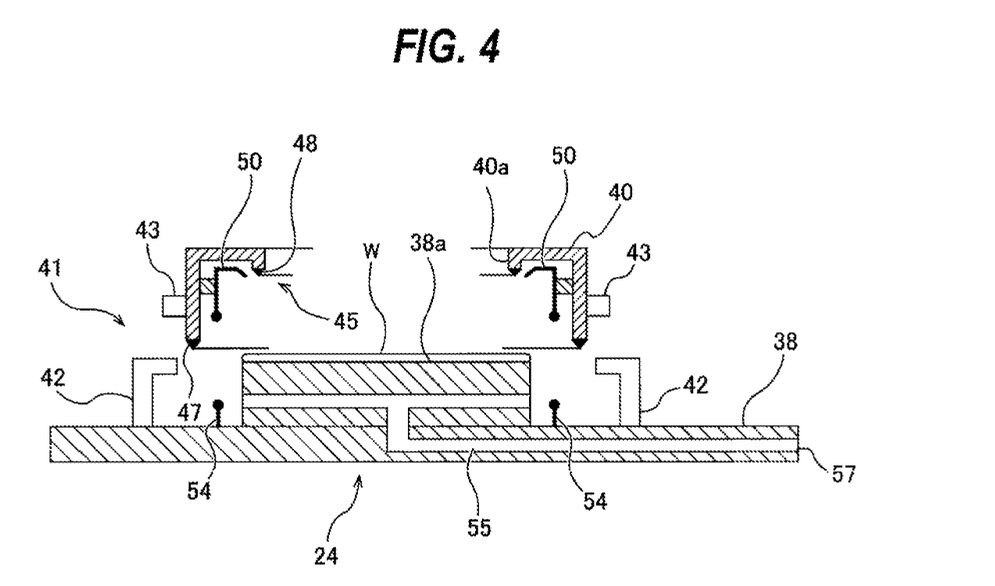
FIG. 4 is a schematic cross-sectional view showing the substrate holder in an open state.

The coupling mechanism 41 includes a plurality of first coupling members 42 secured to the first holding member 38, and a plurality of second coupling members 43 secured to the second holding member 40. The second coupling members 43 are mounted to an outer surface of the second holding member 40. The first coupling members 42 and the second coupling members 43 are configured to be engageable with each other. When the first coupling members 42 and the second coupling members 43 engage with each other, the second holding member 40 is secured to the first holding member 38 (i.e., the substrate holder 24 is closed). The second holding member 40 can be detached from the first holding member 38 (i.e., the substrate holder 24 can be opened) by disengaging the first coupling members 42 and the second coupling members 43. FIG. 4 is a schematic cross-sectional view showing the substrate holder 24 in an open state.

The first holding member 38 has a substrate support surface 38a for supporting a back surface of the substrate W. The substrate W is placed on the substrate support surface 38a. The second holding member 40 has an opening 40a which is smaller than a front surface of the substrate W. In this embodiment, the opening 40a has a circular shape, and a diameter of the opening 40a is smaller than the diameter of the substrate W. When the substrate W is held by the substrate holder 24, the front surface of the substrate W is exposed through the opening 40a. The front surface of the substrate W is a surface to be plated.

The substrate holder 24 includes a seal 45. Specifically, the second holding member 40 of the substrate holder 24 has an endless first seal 48 and an endless second seal 47. The seal 45 includes the first seal 48 and the second seal 47. The first seal 48 and the second seal 47 may be seal members, such as O-rings. In one embodiment, the second holding member 40 itself, including the first seal 48 and the second seal 47, may be formed of a material having a sealing function. The first seal 48 and the second seal 47 may be integral with the second holding member 40. In this embodiment, the first seal 48 and the second seal 47 each have an annular shape and are arranged concentrically.

The second seal 47 is located radially outwardly of the first seal 48. The size (diameter) of the second seal 47 is larger than the size (diameter) of the first seal 48. In a case of a face-down type plating apparatus in which a substrate holder, holding a substrate with its to-be-plated surface facing downward, is disposed horizontally in a plating tank, the second seal 47 may be omitted.

When the second holding member 40 is secured to the first holding member 38 by the coupling mechanism 41 with the back surface of the substrate W supported on the substrate support surface 38a, the first seal 48 is pressed against a peripheral portion of the front surface (to-be-plated surface) of the substrate W, and the second seal 47 is pressed against the first holding member 38. The first seal 48 seals a gap between the second holding member 40 and the front surface of the substrate W, and the second seal 47 seals a gap between the first holding member 38 and the second holding member 40. Consequently, an internal space R is formed in the substrate holder 24.

The internal space R is formed by the seal 45. Specifically, the internal space R is formed by the first holding member 38, the second holding member 40, the first seal 48, the second seal 47, and the substrate W. The substrate holder 24 has a plurality of first electrical contacts 54 and a plurality of second electrical contacts 50 located in the internal space R. The first electrical contacts 54 are fixed to the first holding member 38, and the second electrical contacts 50 are fixed to the second holding member 40. When the substrate W is held by the substrate holder 24, one ends of the second electrical contacts 50 are brought into contact with the peripheral portion of the substrate W. When the substrate holder 24 is in the closed state, the other ends of the second electrical contacts 50 are in contact with one ends of the first electrical contacts 54. The other ends of the plurality of first electrical contacts 54 are respectively coupled to a plurality of electric wires (not shown) extending in the first holding member 38. When the substrate holder 24 is set in the plating tank 10 shown in FIG. 1, the first electrical contacts 54 are electrically coupled to the plating power source 30 shown in FIG. 1 via the aforementioned electric wires.

An internal passage 55 is formed in the first holding member 38. The first holding member 38 has a suction port 57 formed in the outer surface of the first holding member 38. The suction port 57 opens to the outside the first holding member 38. One end of the internal passage 55 communicates with the suction port 57, and the other end communicates with the internal space R. The internal space R is in communication with the suction port 57 through the internal passage 55.

Figure 5:
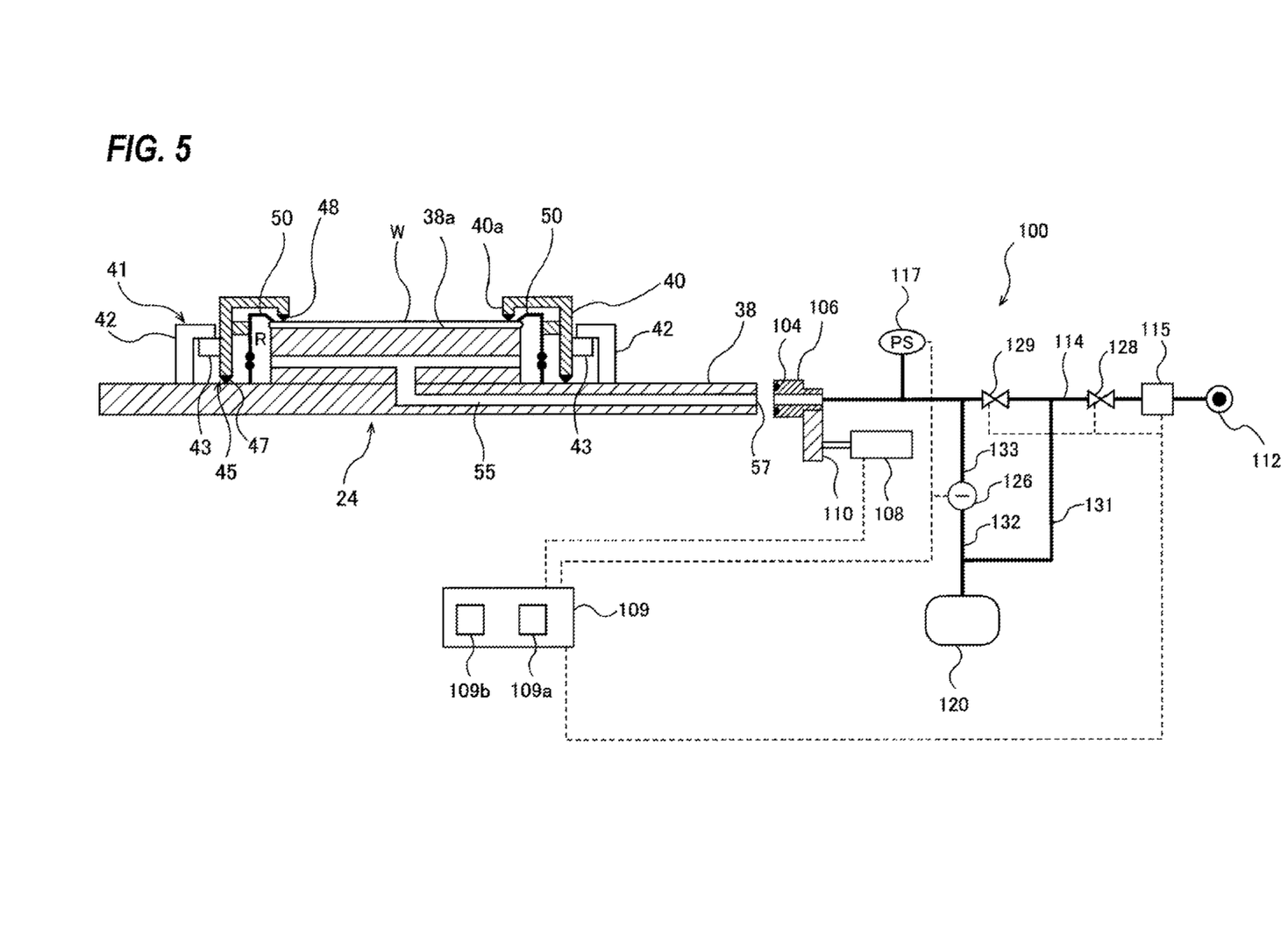
FIG. 5 is a schematic view showing an embodiment of a leak check apparatus for inspecting a sealing state of a seal of the substrate holder.

FIG. 5 is a schematic view showing an embodiment of a leak check apparatus 100 for inspecting a sealing state of the seal 45 of the substrate holder 24. The inspection of the sealing state of the seal 45 is performed by checking whether an air leaks (or intrudes) through the seal 45 into the internal space R in which a negative pressure is developed. The leak check is performed in a state where the substrate holder 24 holds the substrate W or a dummy substrate (or a dummy wafer). If the seal 45 does not properly exhibit its sealing function, the air enters the internal space R, and as a result, the pressure in the internal space R changes. The leak check is conducted by detecting a pressure change in the internal space R. In the present embodiment, the leak check apparatus 100 is provided outside the above-described plating apparatus. In one embodiment, the leak check apparatus 100 may be included in the above-described plating apparatus.

As shown in FIG. 5, the leak check apparatus 100 includes a vacuum line 114 extending from a vacuum source 112 (e.g., a vacuum pump), a pressure regulating valve 115 for regulating the pressure in the internal space R, a pressure measuring device 117 for measuring the pressure in the internal space R, a master container 120 in communication with the vacuum line 114, and a differential-pressure measuring device 126 for measuring a pressure difference between the pressure in the internal space R and the pressure in the master container 120. The master container 120 is a container that is guaranteed not to leak. The pressure regulating valve 115 and the pressure measuring device 117 are coupled to the vacuum line 114. A first on-off valve 128 and a second on-off valve 129 are also coupled to the vacuum line 114. Examples of the vacuum source 112 include a factory vacuum line and a vacuum pump (e.g., an ejector).

One end (a vacuum-source-side end) of the vacuum line 114 is coupled to the vacuum source 112, and the other end (a substrate-holder-side end) is coupled to a suction joint 106 having a seal ring 104. The suction joint 106 is coupled to an actuator 108, such as an air cylinder, via a connection plate 110. The actuator 108 can press the seal ring 104 of the suction joint 106 against the suction port 57 of the substrate holder 24 to couple the suction joint 106 to the substrate holder 24. When the suction joint 106 is coupled to the substrate holder 24, the vacuum line 114 communicates with the internal space R through the suction joint 106, the suction port 57, and the internal passage 55. The leak check apparatus 100 further includes an operation controller 109, and the actuator 108 operates in accordance with instructions from the operation controller 109.

The pressure measuring device 117 is coupled to a part of the vacuum line 114 extending between the substrate-holder-side end of the vacuum line 114 and the second on-off valve 129. The pressure measuring device 117, the second on-off valve 129, the first on-off valve 128, and the pressure regulating valve 115 are arranged in series along the vacuum line 114 in the order of the pressure measuring device 117, the second on-off valve 129, the first on-off valve 128, and the pressure regulating valve 115 from the substrate-holder-side end.

The master container 120 is coupled to a part of the vacuum line 114 extending between the first on-off valve 128 and the second on-off valve 129. Specifically, the master container 120 is coupled to an end of a master-container suction line 131, which is coupled to a part of the vacuum line 114 extending between the first on-off valve 128 and the second on-off valve 129. The master container 120 is in communication with the vacuum line 114 through the master-container suction line 131.

The differential-pressure measuring device 126 is coupled to the master container 120 through a first differential-pressure test line 132, and is further coupled through a second differential-pressure test line 133 to a part of the vacuum line 114 extending between the pressure measuring device 117 and the second on-off valve 129. Thus, when the suction joint 106 is coupled to the substrate holder 24, the differential-pressure measuring device 126 can measure the pressure difference between the pressure in the internal space R and the pressure in the master container 120.

The pressure measuring device 117, the first on-off valve 128, the second on-off valve 129, the differential-pressure measuring device 126, and the pressure regulating valve 115 are electrically coupled to the operation controller 109. The operation controller 109 is configured to open and close the first on-off valve 128 and the second on-off valve 129, and operations of the first on-off valve 128 and the second on-off valve 129 are controlled by the operation controller 109.

The operation controller 109 transmits a predetermined set pressure value to the pressure regulating valve 115, which in turn regulates the pressure in the internal space R according to the above set pressure value. An example of such pressure regulating valve 115 is an electropneumatic regulator. The pressure measuring device 117 is configured to transmit a measurement value of the pressure in the internal space R to the operation controller 109. The differential-pressure measuring device 126 is configured to transmit a measurement value of the pressure difference between the pressure in the internal space R and the pressure in the master container 120 to the operation controller 109.

In one embodiment, the pressure regulating valve 115 may be a manual pressure reducing valve, and the first on-off valve 128 and the second on-off valve 129 may be manual valves that are opened and closed manually.

The operation controller 109 is constituted by at least one computer. The operation controller 109 includes a memory 109a and an arithmetic device 109b therein. The arithmetic device 109b includes CPU (central processing unit) or GPU (graphic processing unit) for performing arithmetic operation according to instructions contained in a program stored in the memory 109a. The memory 109a includes a main memory (for example, random-access memory) which is accessible by the arithmetic device 109b, and an auxiliary memory (for example, a hard disk drive or solid-state drive) that stores data and the program therein.

The operation controller 109 has a first inspection program that causes the operation controller 109 to execute the steps of detecting that the pressure in the internal space R reaches a first pressure threshold value within a predetermined first inspection time while producing a vacuum pressure in the internal space R by opening the first on-off valve 128 and the second on-off valve 129. The operation controller 109 further has a second inspection program that causes the operation controller 109 to execute the steps of closing the first on-off valve 128 to close the internal space R in which the vacuum pressure has been produced, and detecting that the pressure in the closed internal space R does not exceed a second pressure threshold value within a predetermined second inspection time. The operation controller 109 further has a third inspection program that causes the operation controller 109 to execute the steps of closing the second on-off valve 129 to shut off the communication between the internal space R and the master container 120, and detecting that an amount of increase in the pressure difference between the pressure in the closed internal space R and the vacuum pressure in the master container 120 within a predetermined third inspection time is kept equal to or below a pressure difference threshold value.

The first inspection program includes a program that causes the operation controller 109 to execute the steps of generating an alarm signal when the pressure in the internal space R does not reach the first pressure threshold value within the predetermined first inspection time. The second inspection program includes a program that causes the operation controller 109 to execute the step of generating an alarm signal when the pressure in the closed internal space R exceeds the second pressure threshold value within the predetermined second inspection time. The third inspection program includes a program that causes the operation controller 109 to execute the step of generating an alarm signal when the amount of increase in the pressure difference within the predetermined third inspection time exceeds the pressure difference threshold value.

Figure 6:
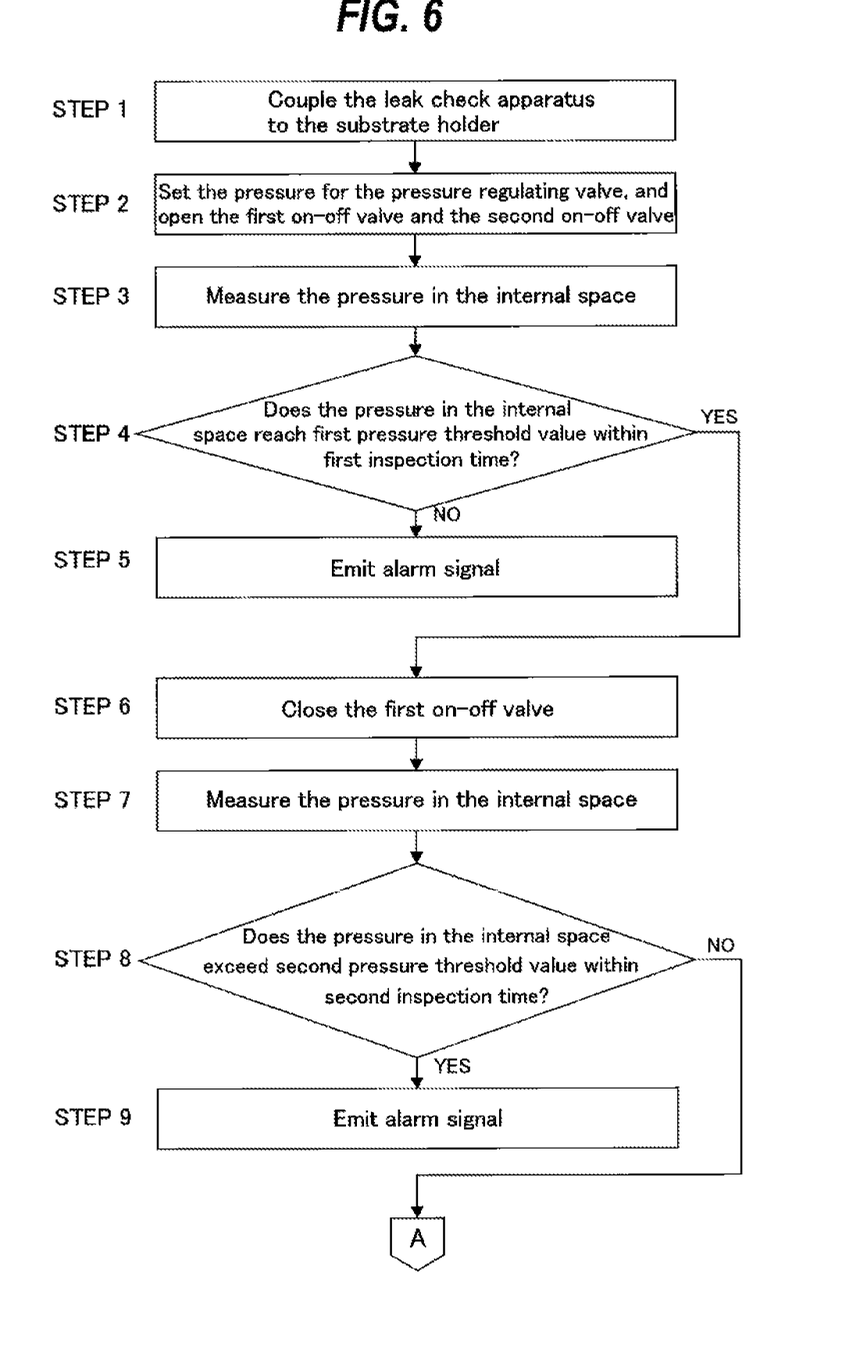
FIG. 6 is a flow chart for illustrating an embodiment of a leak check method for the substrate holder.
Figure 7:
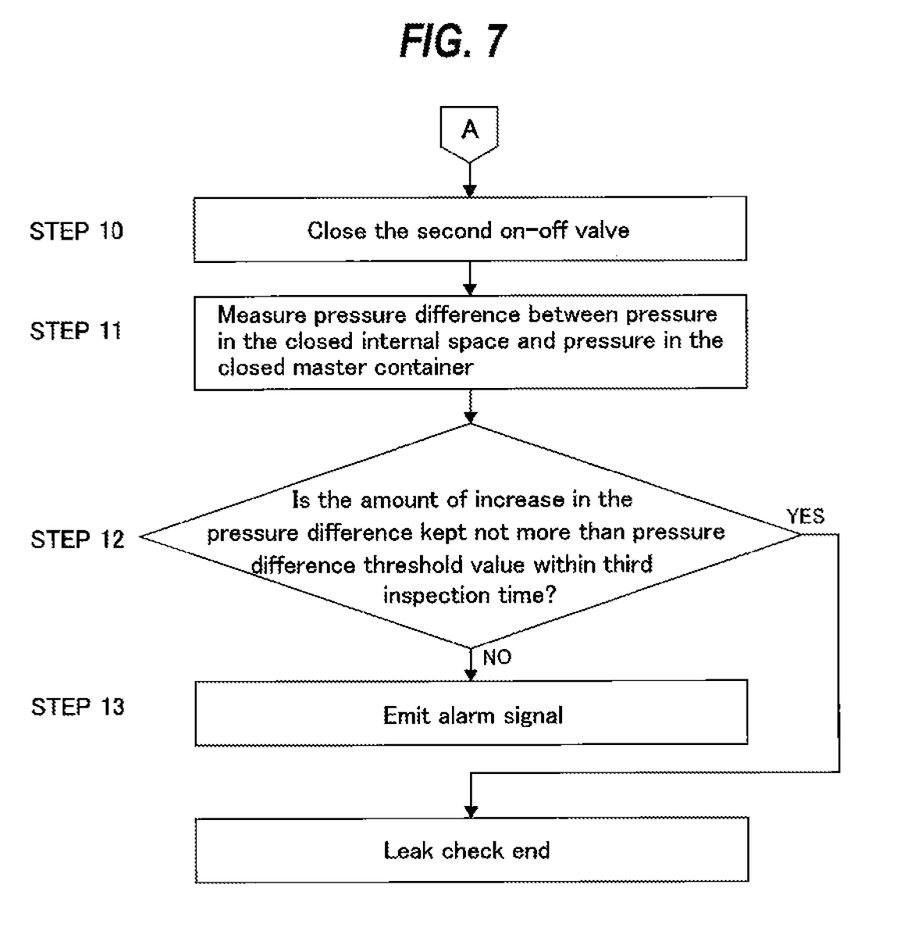
FIG. 7 is a flow chart for illustrating the embodiment of the leak check method for the substrate holder.

One embodiment of the leak check method for the substrate holder 24 will be described with reference to flowcharts shown in FIG. 6 and FIG. 7.

In step 1, the leak check apparatus 100 is coupled to the substrate holder 24. Specifically, the operation controller 109 instructs the actuator 108 to press the seal ring 104 of the suction joint 106 against the suction port 57 of the substrate holder 24 to couple the suction joint 106 to the substrate holder 24. Thus, the vacuum line 114 communicates with the internal space R.

In steps 2 to 5, a first inspection is performed to measure the pressure in the internal space R while evacuating the internal space R of the substrate holder 24, and to detect that the pressure in the internal space R reaches the first pressure threshold value within the predetermined first inspection time. Specifically, the operation controller 109 operates in accordance with the first inspection program to detect that the pressure in the internal space R reaches the first pressure threshold value within the predetermined first inspection time while producing a vacuum pressure in the internal space R by opening the first on-off valve 128 and the second on-off valve 129.

Figure 8:
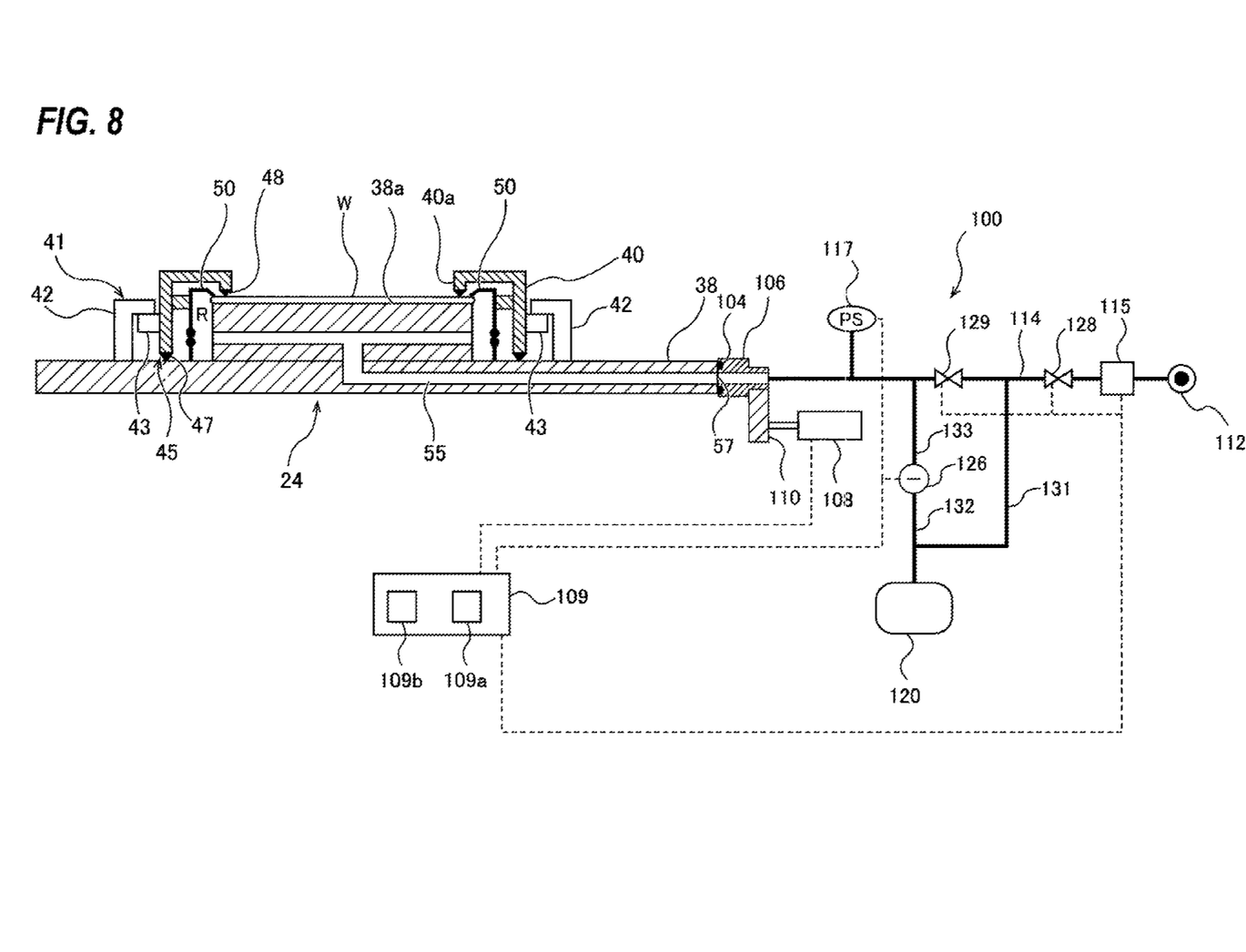
FIG. 8 is a schematic view showing a state of the leak check apparatus in step 2.

The specific operations of the leak check apparatus 100 in the steps 2 to 5 are as follows. In the step 2, the pressure for the pressure regulating valve 115 is set, and the first on-off valve 128 and the second on-off valve 129 are opened. Specifically, the operation controller 109 transmits the set pressure value to the pressure regulating valve 115, and opens the first on-off valve 128 and the second on-off valve 129. FIG. 8 is a schematic view showing the state of the leak check apparatus 100 in the step 2. In FIG. 8, the valve depicted in white indicates the open state. The pressure regulating valve 115 regulates the pressure in the internal space R and the pressure in the master container 120 according to the set pressure value. As a result, the internal space R and the interior of the master container 120 are evacuated.

In one embodiment, only the interior of the master container 120 may be evacuated in advance with the second on-off valve 129 closed, and then the internal space R may be evacuated by opening the second on-off valve 129. According to such operations, it is possible to shorten a time for the pressure in the internal space R to reach the predetermined set pressure value.

In the case where the pressure regulating valve 115 is a manual pressure reducing valve, and the first on-off valve 128 and the second on-off valve 129 are manual valves, setting of the regulation pressure for the pressure regulating valve 115 and opening and closing of the on-off valves 128, 129 may be conducted manually by a user. In the case where the manual pressure reducing valve is used as the pressure regulating valve 115, a pressure lower than a desired set pressure value may be set to the manual pressure reducing valve. This makes it possible to shorten a time for the pressure in the internal space R to reach the predetermined set pressure value.

In the step 3, the pressure in the internal space R is measured by the pressure measuring device 117 while the internal space R is being evacuated. The pressure measuring device 117 transmits a measurement value of the pressure in the internal space R to the operation controller 109.

In the step 4, the operation controller 109 compares the pressure in the internal space R with the predetermined first pressure threshold value, and determines whether the pressure reaches the first pressure threshold value within the predetermined first inspection time. If there is no air leakage into the internal space R, the pressure in the internal space R reaches the first pressure threshold value. In contrast, when the air leaks into the internal space R, the pressure in the internal space R cannot reach the first pressure threshold value. The first pressure threshold value is smaller than the atmospheric pressure and equal to or larger than the set pressure value of the pressure regulating valve 115.

When the operation controller 109 detects that the pressure in the internal space R has reached the first pressure threshold value within the predetermined first inspection time, the operation controller 109 determines that there is no leakage and performs the second inspection described later. When the operation controller 109 detects that the pressure in the internal space R has not reached the first pressure threshold value within the predetermined first inspection time, the operation controller 109 generates an alarm signal (step 5) and urges the user to take measures, such as a maintenance of the substrate holder 24.

The first inspection can detect a relatively large leakage due to an obvious operation failure, such as the substrate holder 24 not properly holding the substrate W, a missing part, or the like.

In steps 6 to 9, the second inspection is performed to close the evacuated internal space R, measure the pressure in the closed internal space R, and detect that the pressure in the closed internal space R does not exceed the second pressure threshold value within the predetermined second inspection time. Specifically, the operation controller 109 operates according to the second inspection program to close the first on-off valve 128 to close the internal space R in which the vacuum pressure has been produced, and detect that the pressure in the closed internal space R does not exceed the second pressure threshold value within the predetermined second inspection time.

Figure 9:
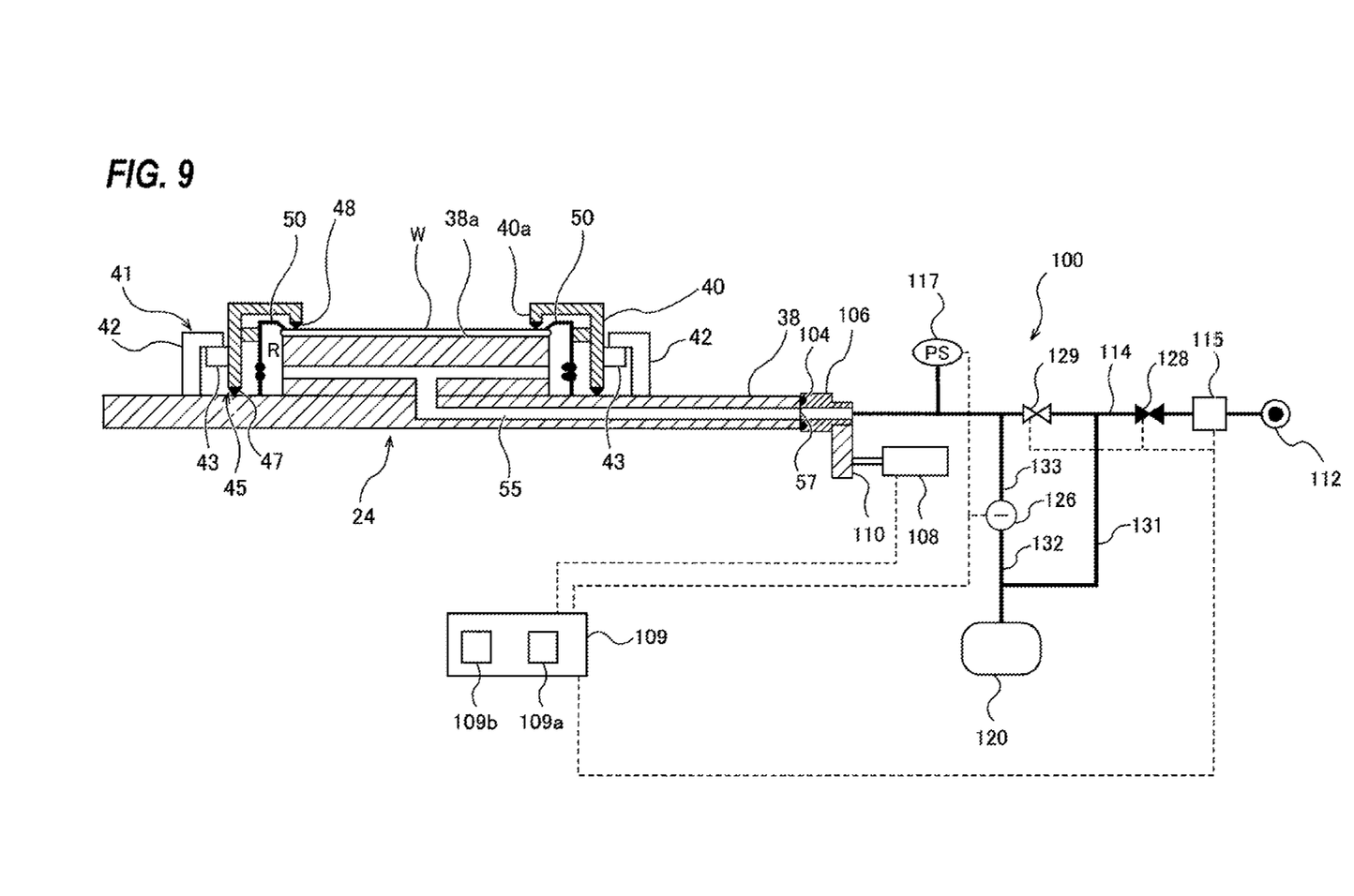
FIG. 9 is a schematic view showing a state of the leak check apparatus in step 6.

The specific operations of the leak check apparatus 100 in the steps 6 to 9 are as follows. In the step 6, the operation controller 109 closes the first on-off valve 128. FIG. 9 is a schematic diagram illustrating a state of the leak check apparatus 100 in the step 6. In FIG. 9, the valve depicted in black indicates the closed state, and the valve depicted in white indicates the open state. When the first on-off valve 128 is closed, both the internal space R and the master container 120 are closed (or sealed). In the case where the first on-off valve 128 and the second on-off valve 129 are manual valves, the user may manually close the first on-off valve 128.

In the step 7, the pressure in the closed internal space R is measured by the pressure measuring device 117. The pressure measuring device 117 transmits the pressure measurement value to the operation controller 109.

In the step 8, the operation controller 109 compares the pressure in the internal space R with the predetermined second pressure threshold value, and determines whether the pressure exceeds the second pressure threshold value within the predetermined second inspection time. When there is no air leakage into the internal space R, the pressure in the internal space R and the pressure in the master container 120 do not increase (i.e., do not change). In contrast, when there is air leakage into the internal space R, the pressure gradually increases.

When the operation controller 109 detects that the pressure in the internal space R does not exceed the second pressure threshold value within the predetermined second inspection time, the operation controller 109 determines that there is no leakage and performs the third inspection described later. When the operation controller 109 detects that the pressure in the internal space R exceeds the second pressure threshold value within the predetermined second inspection time, the operation controller 109 generates an alarm signal (step 9), the operation controller 109 urges the user to take measures, such as maintenance of the substrate holder 24. In the present embodiment, the second pressure threshold value is a relative value determined by adding a predetermined amount of increase to a lowest point of the pressure in the internal space R. In one embodiment, the second pressure threshold value may be an absolute value of pressure. The second pressure threshold value may be the same as the first pressure threshold value, or may be larger or smaller than the first pressure threshold value. As an example, when the set pressure value is −5 kPa, the second pressure threshold value may be −4 kPa.

In the second inspection, the leak check apparatus 100 can detect a relatively small leakage due to deformation of the first seal 48 or other causes.

In steps 10 to 13, the third inspection is performed to measure the pressure difference between the pressure in the closed internal space R and the vacuum pressure in the master container 120, and detect that the amount of increase in the pressure difference within the predetermined third inspection time is kept equal to or below the pressure difference threshold value. Specifically, the operation controller 109 operates according to the third inspection program to close the second on-off valve 129 to shut off the communication between the internal space R and the master container 120, and detect that the amount of increase in the pressure difference between the pressure in the closed internal space R and the vacuum pressure in the master container 120 within the predetermined third inspection time is kept equal to or below the pressure difference threshold value.

Figure 10:
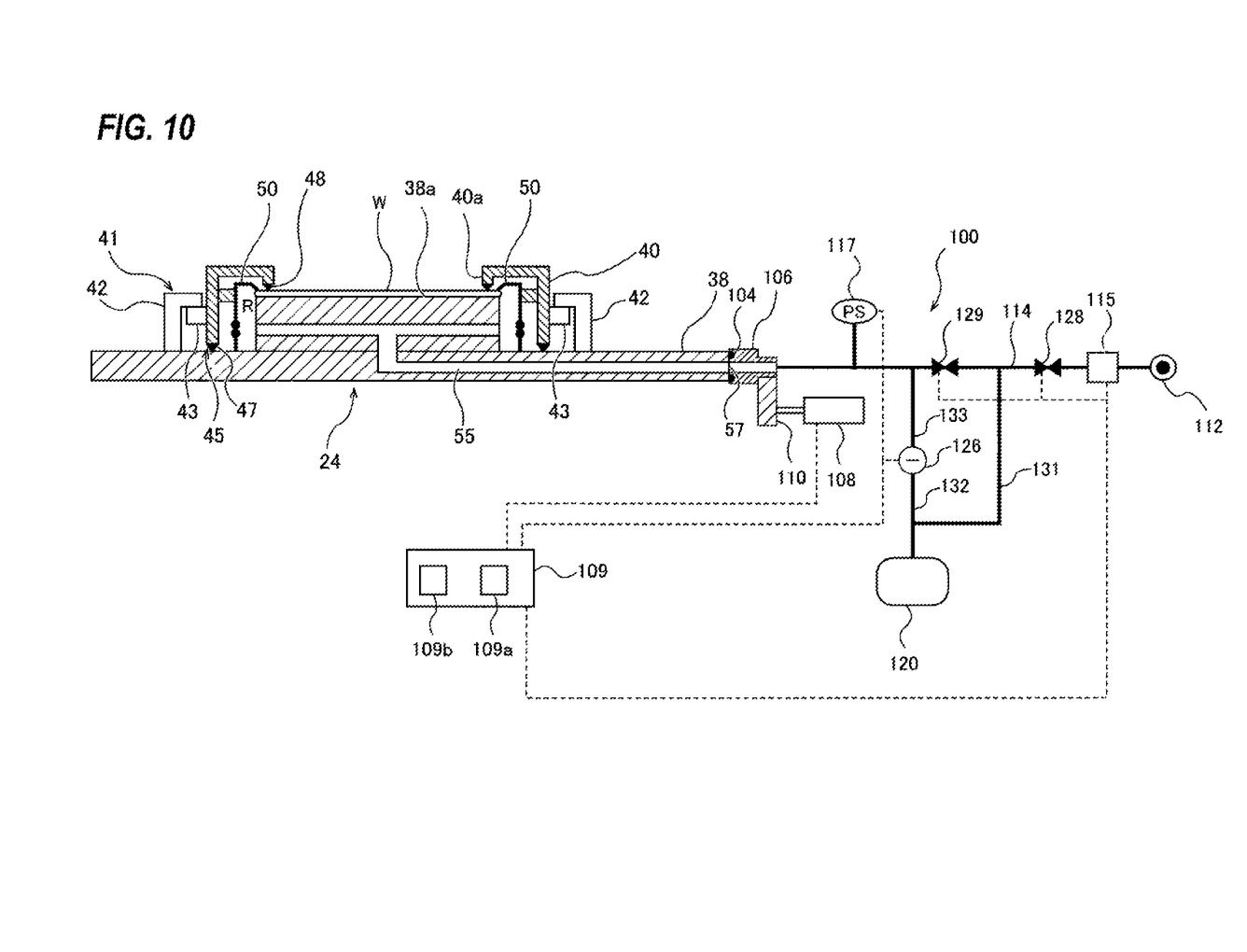
FIG. 10 is a schematic view showing a state of the leak check apparatus in step 10.

The specific operations of the leak check apparatus 100 in the steps 10 to 13 are as follows. In the step 10, the operation controller 109 closes the second on-off valve 129. FIG. 10 is a schematic diagram showing the state of the leak check apparatus 100 in the step 10. In FIG. 10, the valve depicted in black indicates the closed state. When both the first on-off valve 128 and the second on-off valve 129 are closed, the internal space R in which the vacuum pressure has been produced and the interior of the master container 120 in which the vacuum pressure has also been produced are separated and closed (or sealed). When the first on-off valve 128 and the second on-off valve 129 are manual valves, the user may manually close the second on-off valve 129.

In the step 11, the differential-pressure measuring device 126 measures the pressure difference between the pressure in the closed internal space R and the pressure in the closed master container 120. The differential-pressure measuring device 126 transmits a measurement value of the pressure difference to the operation controller 109.

In the step 12, the operation controller 109 compares the pressure difference with the predetermined pressure difference threshold value, and determines whether the amount of increase in the pressure difference is kept equal to or below the pressure difference threshold value within the predetermined third inspection time. When there is no air leakage into the internal space R, the amount of increase in the pressure difference is kept equal to or below the pressure difference threshold value. In contrast, when there is air leakage into the internal space R, the pressure difference increases above the pressure difference threshold value.

If the operation controller 109 detects that the amount of increase in the pressure difference within the predetermined third inspection time is kept equal to or below the pressure difference threshold value, the operation controller 109 determines that there is no leakage and terminates the leak check. After the termination of the leak check, the plating apparatus shown in FIG. 1 plates the substrate W using the substrate holder 24 that has been subjected to the leak check. When the operation controller 109 detects that the amount of increase in the pressure difference within the predetermined third inspection time has exceeded the pressure difference threshold value, the operation controller 109 generates an alarm signal (step 13) and urges the user to take measures, such as maintenance of the substrate holder 24.

In the third inspection, the leak check apparatus 100 can detect a minute leak due to a certain cause, such as existence of a small foreign matter sandwiched between the substrate W and the first seal 48. As described above, measuring the pressure difference between the vacuum pressure in the closed internal space R and the vacuum pressure in the closed master container 120 allows for more accurate detection of a slight change in the pressure in the internal space R, compared with directly measuring the pressure change in the internal space R using the pressure measuring device 117.

In one embodiment, based on the plating conditions for the substrate W, any one of a simple leak check, a composite leak check, and a precision leak check may be selected and performed. The simple leak check includes only the first inspection, the composite leak check includes the first inspection and the second inspection, and the precision leak check includes the first inspection, the second inspection, and the third inspection. After the termination of the leak check, the plating apparatus shown in FIG. 1 plates the substrate W using the substrate holder 24 that has been subjected to the leak check.

The plating conditions for the substrate W include a thickness of the seed layer of the substrate to be plated, a plating time for the substrate to be plated, and the like. For example, if the seed layer has a large thickness, a minute leakage may be permissible. Similarly, when the plating time is short, a minute leakage may be permissible. Therefore, when the thickness of the seed layer is large or when the plating time is short, the simple leak check or the composite leak check may be selected. On the other hand, when the thickness of the seed layer is small or when the plating time is long, even a minute leak is not permissible, so that the precision leak check may be selected.

If a liquid, such as a plating solution, enters the internal space R, the electrical contacts 50, 54 and the seed layer may be corroded. When the corrosion occurs, the current supplied to the substrate, to be plated, becomes non-uniform, thus affecting the uniformity of the thickness of the plating film. When the thickness of the seed layer is small, the influence of the corrosion on the uniformity of the thickness of the plating film is larger than that when the film thickness of the seed layer is large. Therefore, a minute leakage may be permissible when the seed layer is thick. On the other hand, when the thickness of the seed layer is small, there is a high possibility that the uniformity of the thickness of the plating film is deteriorated. Accordingly, even a minute leakage is not permissible.

In this embodiment, in the case where the thickness of the seed layer of the substrate, to be plated, is larger than a predetermined reference film thickness, or in the case where the plating time for the substrate, to be plated, is shorter than a predetermined reference plating time, the precision leak check is not performed, while either the simple leak check or the composite leak check is performed. Performing either the simple leak check or the composite leak check can result in a decreased inspection time and an improvement of the throughput.

In the case where the thickness of the seed layer of the substrate, to be plated, is small, even a minute leakage is not permissible because, if the seed layer of the substrate is corroded by the plating solution, the supply of electricity to the substrate can be hindered immediately. Similarly, in the case where the plating time for the substrate is set to be long, the substrate holder 24 is immersed in the plating solution for a long time, so that even a minute leakage is not permissible. Therefore, when the thickness of the seed layer of the substrate, to be plated, is equal to or less than a predetermined reference film thickness, or when the plating time for the substrate, to be plated, is equal to or longer than a predetermined reference plating time, the precision leak check may be performed.

According to the above-described embodiments, the leak check is performed in three stages, and therefore the degree of leakage can be determined more finely. Moreover, the throughput can be improved by performing the leak check selected based on the plating conditions of the substrate.

The substrate W in each of the embodiments described previously is a circular substrate, such as a wafer, but the present invention can be applied to a quadrilateral substrate, such a square substrate, as well. Each component of the substrate holder 24 for holding the quadrilateral substrate has a shape that conforms to the shape of the quadrilateral substrate. For example, the opening 40a described above is a quadrilateral opening smaller than the size of the entire quadrilateral substrate. Various sealing elements, such as the second seal 47 and the first seal 48, are also shaped so as to conform to the shape of the quadrilateral substrate. The shapes of other components are also modified appropriately without departing from the technical concept discussed above.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed:

1. A leak check apparatus for a substrate holder to be used in plating of a substrate, comprising:
   a vacuum line communicating with an internal space formed by a seal of the substrate holder;
   a first on-off valve coupled to the vacuum line;
   a second on-off valve coupled to the vacuum line;
   a pressure measuring device configured to measure a pressure in the internal space;
   a master container communicating with the vacuum line;
   a differential-pressure measuring device configured to measure a pressure difference between a pressure in the internal space and a pressure in the master container; and
   an operation controller configured to control operations of the first on-off valve and the second on-off valve,
   the pressure measuring device is coupled to a part of the vacuum line extending between a substrate-holder-side end of the vacuum line and the second on-off valve,
   the master container is coupled to a part of the vacuum line extending between the first on-off valve and the second on-off valve, and the pressure measuring device, the second on-off valve, and the first on-off valve are arranged in series along the vacuum line in an order of the pressure measuring device, the second on-off valve, and the first on-off valve, the operation controller is configured to detect that a pressure in the internal space reaches a first pressure threshold value within a predetermined first inspection time, while producing a vacuum pressure in the internal space by opening the first on-off valve and the second on-off valve, and the operation controller is configured to close the first on-off valve to close both the master container and the internal space in which the vacuum pressure has been produced while maintaining fluid communication between the internal space and the master container, and detect that the pressure in the closed internal space and a pressure in the closed master container do not exceed a second pressure threshold value within a predetermined second inspection time.

2. The leak check apparatus according to claim 1, wherein the operation controller is configured to generate an alarm signal when the pressure in the internal space does not reach the first pressure threshold value within the predetermined first inspection time.

3. The leak check apparatus according to claim 1, wherein the operation controller is configured to generate an alarm signal when the pressure in the closed internal space exceeds the second pressure threshold value within the predetermined second inspection time.

4. The method according to claim 1, wherein the second pressure threshold value is a relative value determined by adding a predetermined amount of increase to a lowest point of the pressure in the internal space.

5. The leak check apparatus according to claim 1, wherein the operation controller is configured to close the second on-off valve to shut off a communication between the internal space and the master container, and detect that an amount of increase in a pressure difference between the pressure in the closed internal space and the vacuum pressure in the master container within a predetermined third inspection time is kept equal to or below a pressure difference threshold value.

6. The leak check apparatus according to claim 5, wherein the operation controller is configured to generate an alarm signal when the amount of increase in the pressure difference within the predetermined third inspection time exceeds the pressure difference threshold value.

7. A plating apparatus comprising:
a plating tank configured to hold a plating solution therein;
an anode arranged in the plating tank;
a substrate holder configured to detachably hold a substrate and immerse the substrate in the plating solution in the plating tank;
a plating power source configured to apply a voltage between the anode and the substrate held by the substrate holder; and
a leak check apparatus including:
(i) a vacuum line communicating with an internal space formed by a seal of the substrate holder;
(ii) a first on-off valve coupled to the vacuum line;
(iii) a second on-off valve coupled to the vacuum line;
(iv) a pressure measuring device configured to measure a pressure in the internal space;
(v) a master container communicating with the vacuum line; and
(vi) a differential-pressure measuring device configured to measure a pressure difference between a pressure in the internal space and a pressure in the master container; and
(vii) an operation controller configured to control operations of the first on-off valve and the second on-off valve, wherein the pressure measuring device is coupled to a part of the vacuum line extending between a substrate-holder-side end of the vacuum line and the second on-off valve, the master container is coupled to a part of the vacuum line extending between the first on-off valve and the second on-off valve, the pressure measuring device, the second on-off valve, and the first on-off valve are arranged in series along the vacuum line in an order of the pressure measuring device, the second on-off valve, and the first on-off valve, the operation controller is configured to detect that a pressure in the internal space reaches a first pressure threshold value within a predetermined first inspection time, while producing a vacuum pressure in the internal space by opening the first on-off valve and the second on-off valve, and the operation controller is configured to close the first on-off valve to close both the master container and the internal space in which the vacuum pressure has been produced while maintaining fluid communication between the internal space and the master container, and detect that the pressure in the closed internal space and a pressure in the closed master container do not exceed a second pressure threshold value within a predetermined second inspection time.

8. The method according to claim 7, wherein the second pressure threshold value is a relative value determined by adding a predetermined amount of increase to a lowest point of the pressure in the internal space.

* * * * *